Sept. 2, 1930.  J. S. HERRON  1,775,038
POWER CONTROL MECHANISM
Filed June 29, 1928   2 Sheets-Sheet 1

James S. Herron
INVENTOR
BY Victor J. Evans
ATTORNEY

WITNESS

Sept. 2, 1930.  J. S. HERRON  1,775,038
POWER CONTROL MECHANISM
Filed June 29, 1928   2 Sheets-Sheet 2
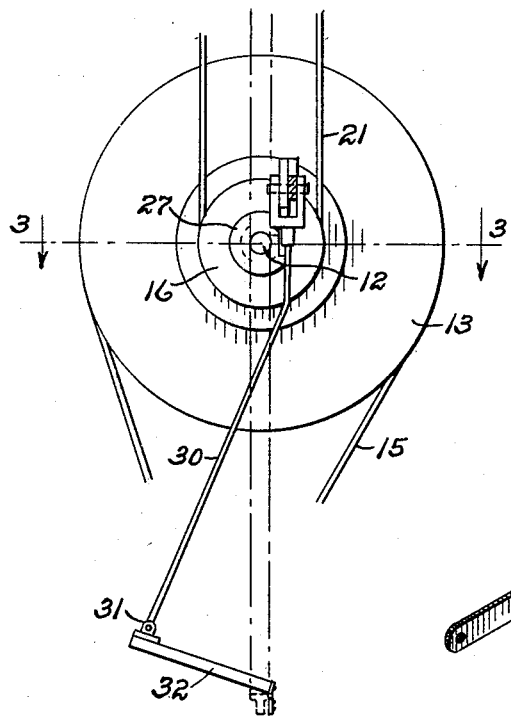
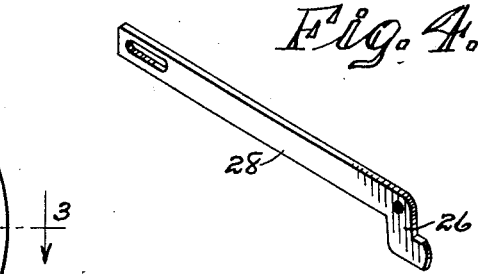
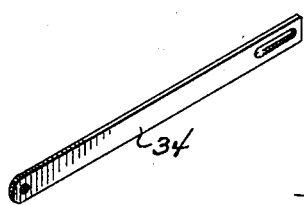
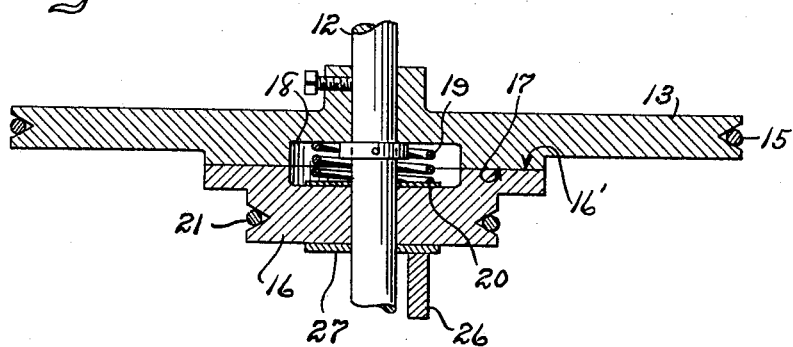
James S. Herron
INVENTOR
BY Victor J. Evans
ATTORNEY
WITNESS:

Patented Sept. 2, 1930

1,775,038

UNITED STATES PATENT OFFICE

JAMES S. HERRON, OF COVINGTON, OKLAHOMA

POWER-CONTROL MECHANISM

Application filed June 29, 1928. Serial No. 289,218.

This invention relates to improvements in power driven mechanisms and is especially adapted for controlling the operation of sewing machines of the type used for sewing leather, and heavy fabric.

An object of the present invention is the provision of a clutch controlling means for machines of this character, whereby the starting, stopping and speed of operation of the machine may be controlled by the foot of the operator, and thus leave both of his hands free for handling the work.

With the above and other objects in view, the invention further includes the following novel features and details of construction, to be hereinafter more fully described, illustrated in the accompanying drawings and pointed out in the appended claim.

In the drawings:—

Figure 2 is a fragmentary sectional view on the line 2—2 of Figure 1.

Figure 3 is an enlarged section on the line 3—3 of Figure 2.

Figure 4 is a detail perspective view of the bell crank lever.

Figure 5 is a like view of the pivoted arm.

Figure 6 is a detail perspective view of the bracket.

Figure 1:
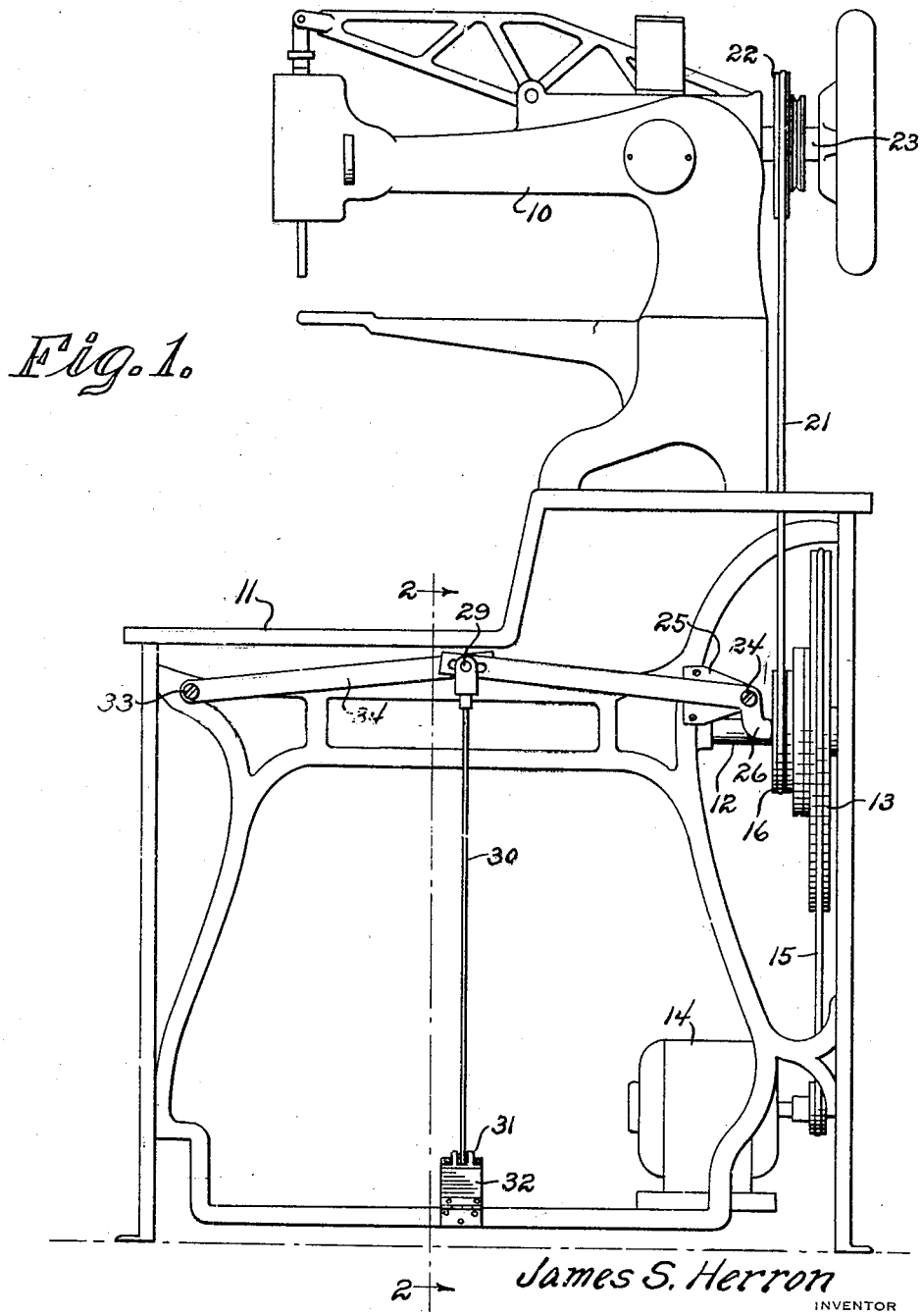
Figure 1 is an elevation of a sewing machine equipped with the invention.

Referring to the drawings in detail wherein like characters of reference denote corresponding parts, the invention is shown as applied to a sewing machine which includes a head 10 mounted upon a stand 11 whose supporting frame rotatably supports a driven shaft 12. This shaft has fast thereon a driven wheel 13 which is provided with a peripheral groove, and this wheel is driven from a motor 14 through the medium of a belt 15.

Freely rotatable upon the shaft 12 is a power take-off pulley 16 and this pulley has its inner flat face 16' arranged to frictionally engage a flat face 17 provided upon the wheel 13. The adjacent faces of the wheel 13 and the pulley 16 are provided with recesses 18 within which is arranged a coiled spring 19, the latter actuating to yieldingly separate the faces 16' and 17. The spring 19 bears upon a wear plate 20 provided within the recess of the pulley 16.

The pulley 16 is peripherally grooved to receive a belt 21 and this belt engages a grooved pulley 22 provided upon the shaft 23 of the head 10. Thus, when the friction faces 16' and 17 are engaged, motion will be imparted to the shaft 23 proportionate to the degree of frictional contact.

Pivotally mounted as shown at 24 upon a bracket 25 secured to the frame of the machine is a bell crank lever having a short arm 26 whose free end is adapted to engage a wear plate 27 carried by the outer face of the pulley 16. The other or long arm 28 has its outer end slotted for the passage of a pin 29 which serves to connect this arm of the lever with one end of the rod 30. The other end of this rod is pivotally connected as shown at 31 with a foot pedal 32 which is mounted upon the frame of the machine.

Pivotally mounted upon the machine frame as shown at 33 is one end of an arm 34 and the other end of this arm is connected with the long arm 28 of the bell crank lever through the pin 29.

Normally, the spring 19 separates the pulley 16 from the wheel 13, so that the pulley will be free upon the driven shaft 12 and will not rotate when the motor 14 is operating. When it is desired to operate the machine, the foot pedal 32 is pressed downward so to move the bell crank lever pivotally and force the friction faces 16' and 17 into engagement, the degree of engagement determining the speed of operation of the machine. As soon as pressure upon the pedal 32 is released, the friction faces 16' and 17 will be separated.

The arm 34 acts to steady the outer end of the arm 28 of the bell crank lever in its pivotal movement.

The invention is susceptible of various changes in its form, proportions and minor details of construction and the right is herein reserved to make such changes as properly fall within the scope of the appended claim.

Having described the invention what is claimed is:

In a power driven mechanism, a driven shaft, a driven wheel fast upon said shaft and operatively connected with a source of power, a power take-off wheel freely mounted upon said shaft and adapted to engage the driven wheel to receive motion, spring means to yieldingly separate the wheels, a pivotally mounted bell crank lever having one of its arms arranged to engage the take-off wheel to force the latter into engagement with the driven wheel when said lever is moved pivotally, a foot pedal, a rod connecting the other arm of the bell crank lever with the foot pedal to actuate said lever when the pedal is operated, and an arm having one end pivotally mounted and its other end connected with said other arm of the bell crank lever at its point of connection with the rod.

In testimony whereof I affix my signature.

JAMES S. HERRON.